United States Patent
Okada

(10) Patent No.: US 12,231,712 B2
(45) Date of Patent: Feb. 18, 2025

(54) MOVING IMAGE REPRODUCTION APPARATUS, MOVING IMAGE REPRODUCTION SYSTEM, AND MOVING IMAGE REPRODUCTION METHOD

(71) Applicant: SONY INTERACTIVE ENTERTAINMENT INC., Tokyo (JP)

(72) Inventor: Michihiro Okada, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 100 days.

(21) Appl. No.: 17/777,601

(22) PCT Filed: Nov. 26, 2020

(86) PCT No.: PCT/JP2020/044099
§ 371 (c)(1),
(2) Date: May 17, 2022

(87) PCT Pub. No.: WO2021/111988
PCT Pub. Date: Jun. 10, 2021

(65) Prior Publication Data
US 2022/0408140 A1 Dec. 22, 2022

(30) Foreign Application Priority Data
Dec. 3, 2019 (JP) .................................. 2019-218746

(51) Int. Cl.
*H04N 21/43* (2011.01)
*G11B 27/10* (2006.01)
(Continued)

(52) U.S. Cl.
CPC ......... *H04N 21/4302* (2013.01); *G11B 27/10* (2013.01); *H04N 21/437* (2013.01); *H04N 21/8547* (2013.01)

(58) Field of Classification Search
CPC ............. H04N 21/4302; H04N 21/437; H04N 21/8547; G11B 27/10
See application file for complete search history.

(56) References Cited

U.S. PATENT DOCUMENTS

| | | | | |
|---|---|---|---|---|
| 8,640,181 B1 * | 1/2014 | Inzerillo | .............. | H04N 21/242 725/151 |
| 2009/0089352 A1 * | 4/2009 | Davis | .................. | H04N 21/812 709/201 |

(Continued)

FOREIGN PATENT DOCUMENTS

| | | |
|---|---|---|
| JP | 2008005112 A | 1/2008 |
| JP | 2012105236 A | 5/2012 |

(Continued)

OTHER PUBLICATIONS

International Search Report and Written Opinion mailed Feb. 22, 2021, from PCT/JP2020/044099, 10 sheets.

(Continued)

*Primary Examiner* — Randy A Flynn
(74) *Attorney, Agent, or Firm* — XSENSUS LLP

(57) ABSTRACT

A moving image distribution server 12 transfers, by streaming, data of a plurality of moving images representing the same space. A moving image reproduction apparatus 10 separates audio data from any one of the moving images and outputs the audio data after a predetermined period of delay. The moving image reproduction apparatus 10 also separates image data from another moving image and outputs the image data in synchronization with audio. When a user performs an image switching operation, the moving image reproduction apparatus 10 acquires data of a moving image that has been switched from another moving image, separates image data therefrom, and starts outputting the image data given the same PTS as the audio data continuously being output.

20 Claims, 13 Drawing Sheets

(51) Int. Cl.
*H04N 21/437* (2011.01)
*H04N 21/8547* (2011.01)

(56) References Cited

U.S. PATENT DOCUMENTS

| | | | |
|---|---|---|---|
| 2010/0088159 A1* | 4/2010 | Henshaw | G06F 3/0484 |
| | | | 348/E7.024 |
| 2012/0002109 A1* | 1/2012 | Kennedy | H04N 21/233 |
| | | | 348/E7.001 |
| 2013/0202265 A1* | 8/2013 | Arrasvuori | H04N 21/23418 |
| | | | 386/E5.069 |
| 2014/0098185 A1* | 4/2014 | Davari | H04N 7/00 |
| | | | 348/E7.001 |
| 2014/0173467 A1* | 6/2014 | Clavel | H04L 12/1822 |
| | | | 715/758 |
| 2015/0121436 A1* | 4/2015 | Rango | H04N 21/2365 |
| | | | 725/88 |
| 2015/0143239 A1* | 5/2015 | Birkbeck | H04N 21/45 |
| | | | 715/716 |
| 2017/0264920 A1* | 9/2017 | Mickelsen | H04N 21/21805 |
| 2018/0255332 A1* | 9/2018 | Heusser | H04N 21/2187 |
| 2019/0222748 A1* | 7/2019 | Weir | G06F 3/0488 |

FOREIGN PATENT DOCUMENTS

| | | |
|---|---|---|
| JP | 2017-108217 A | 6/2017 |
| JP | 2017225044 A | 12/2017 |
| JP | 2018-93349 A | 6/2018 |
| JP | 2018125621 A | 8/2018 |
| JP | 2018523386 A | 8/2018 |
| WO | 2004/077825 A1 | 9/2004 |
| WO | 2017/204109 A1 | 11/2017 |

OTHER PUBLICATIONS

Notice of Reasons for Refusal drafted May 23, 2023, from Japanese Patent Application No. 2019-218746, 4 sheets.

* cited by examiner

MOVING IMAGE REPRODUCTION APPARATUS, MOVING IMAGE REPRODUCTION SYSTEM, AND MOVING IMAGE REPRODUCTION METHOD

TECHNICAL FIELD

The present invention relates to a moving image reproduction apparatus, an image reproduction system, and a moving image reproduction method for reproducing a moving image by using a network.

BACKGROUND ART

With the progress of image processing techniques and the expansion of network environments, it has become possible to easily enjoy various moving images regardless of the terminal and the environment in use. Services for distributing moving images by streaming have also been widespread, and various standards have been established. For example, according to HLS (HTTP (Hypertext Transfer Protocol) Live Streaming), a distribution server provides data of segments obtained by dividing a moving image into a predetermined length of several seconds to several tens of seconds, and a playlist (or an index file) that defines the storage location, the reproduction order, and the like of the data. A client first acquires a playlist and reproduces a moving image by requesting the server for necessary segment data (see, for example, PTL 1). Similar standards include MPEG (Moving Picture Experts Group)-DASH (Dynamic Adaptive Streaming over HTTP), CMAF (Common Media Application Format), and the like (see, for example, PTL 2 and PTL 3).

CITATION LIST

Patent Literature

[PTL 1]
Japanese Patent Laid-Open No. 2018-93349
[PTL 2]
Japanese Patent Laid-Open No. 2017-108217
[PTL 3]
PCT Patent Publication No. WO2017/204109

SUMMARY

Technical Problem

Moving image streaming distribution is basically aimed at enabling multiple clients to watch a common moving image. Meanwhile, the above-described techniques are realizing flexibility that matches the circumstance of each client, such as reproduction by random access and changing of the image quality level according to the network environment. In the future, it is desired to enable more diverse operations according to the preferences and intentions of individual viewers.

The present invention has been made in view of the issue, and an object of the present invention is to provide a technique for suitably performing a user operation on a moving image to be distributed by streaming.

Solution to Problem

A mode of the present invention relates to a moving image reproduction apparatus. The moving image reproduction apparatus includes a data acquisition section configured to acquire data of a plurality of moving images transferred from a server by streaming, the plurality of moving images representing the same space, a data separation section configured to acquire audio data from one of the plurality of moving images and acquire image data from another one of the plurality of moving images, and an output control section configured to output the audio data and the image data in synchronization with each other.

Another mode of the present invention relates to a moving image reproduction system. The moving image reproduction system includes a server configured to transfer, by streaming, data of a plurality of moving images representing the same space, and a moving image reproduction apparatus configured to output a moving image to a display by using the data of the plurality of moving images. The moving image reproduction apparatus includes a data acquisition section configured to acquire the data of the plurality of moving images from the server, a data separation section configured to acquire audio data from one of the plurality of moving images and acquire image data from another one of the plurality of moving images, and an output control section configured to output the audio data and the image data in synchronization with each other.

Still another mode of the present invention relates to a moving image reproduction method. The moving image reproduction method is performed by a moving image reproduction apparatus and includes a step of acquiring data of a plurality of moving images transferred from a server by streaming, the plurality of moving images representing the same space, a step of acquiring audio data from one of the plurality of moving images and acquiring image data from another one of the plurality of moving images, and a step of outputting the audio data and the image data to a display in synchronization with each other.

It is noted that any combination of the constituent components described above and conversions of the expressions of the present invention between a method, an apparatus, a system, a computer program, a recording medium having a computer program recorded therein, and the like are also effective as modes of the present invention.

Advantageous Effect of Invention

According to the present invention, a user operation on a moving image to be distributed by streaming can suitably be performed.

DESCRIPTION OF EMBODIMENT

Figure 1:
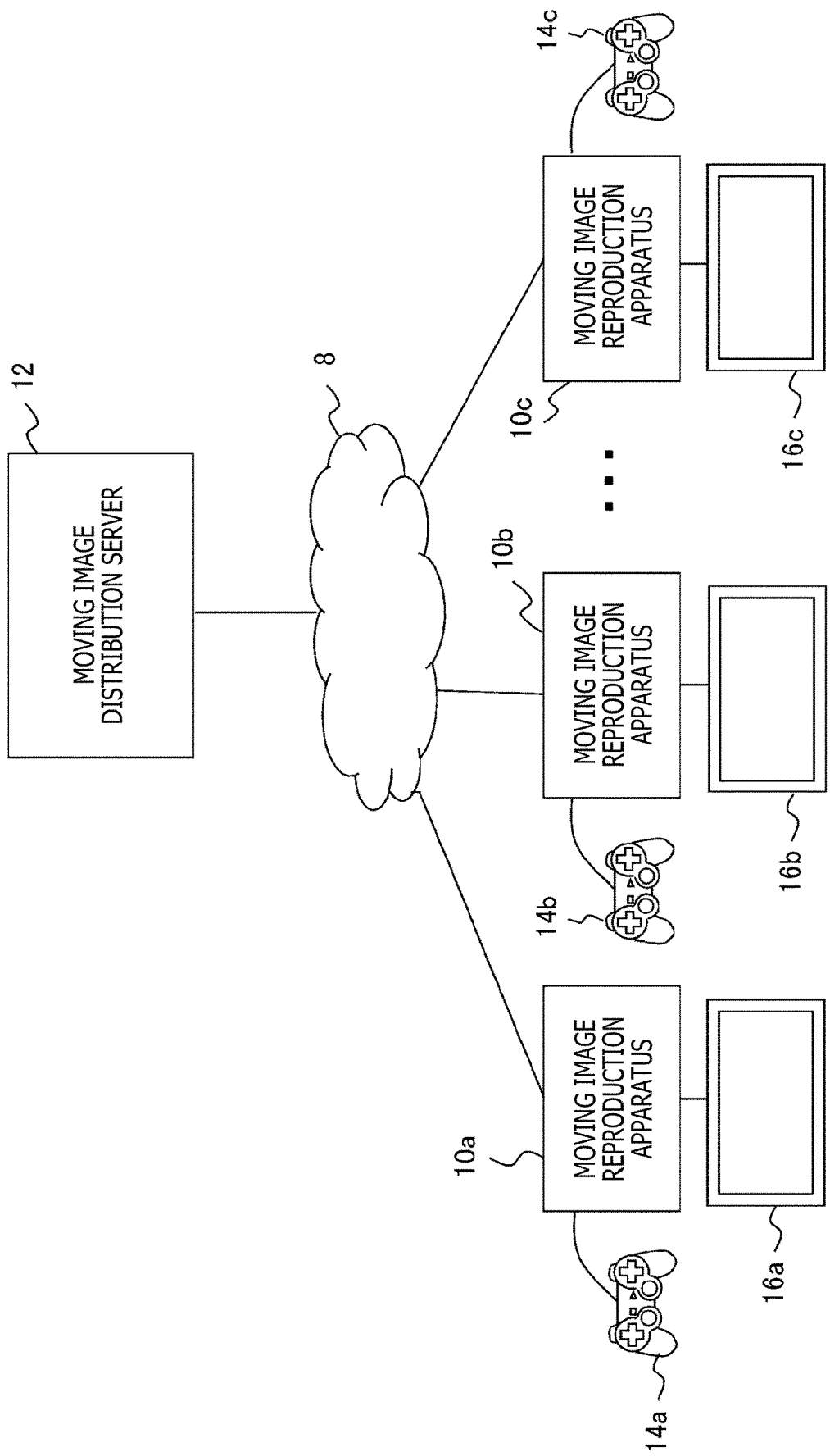
FIG. 1 is a diagram exemplifying a moving image reproduction system to which the present embodiment can be applied.

FIG. 1 exemplifies a moving image reproduction system to which the present embodiment can be applied. The illustrated moving image reproduction system has a configuration in which a plurality of moving image reproduction apparatuses 10a, 10b, 10c, . . . are connected to a moving image distribution server 12 via a network 8. The moving image reproduction apparatuses 10a, 10b, 10c, . . . are client terminals operated by their respective users and are respectively connected to input apparatuses 14a, 14b, 14c, . . . and to displays 16a, 16b, 16c, . . . in a wired or wireless manner.

Hereinafter, the moving image reproduction apparatuses 10a, 10b, 10c, . . . will collectively be referred to as a moving image reproduction apparatus 10, the input apparatuses 14a, 14b, 14c, . . . will collectively be referred to as an input apparatus 14, and the displays 16a, 16b, 16c, . . . will collectively be referred to as a display 16, in some cases. The moving image reproduction apparatus 10, the input apparatus 14, and the display 16 may each have a separate housing as illustrated in FIG. 1, or two or more of them may integrally be provided. One example may be a mobile terminal or the like integrally including the moving image reproduction apparatus 10, the input apparatus 14, and the display 16.

Further, the display 16 may be a general flat-panel display such as a television receiver or may be a wearable display such as a head-mounted display. In any case, the display 16 includes a display panel for displaying an image and a speaker for outputting audio. However, the speaker may be provided separately from the display 16. The moving image reproduction apparatus 10 may be any of a personal computer, a game machine, a content reproduction apparatus, and the like. The network 8 may be the Internet, a LAN (Local Area Network), or the like, and the scale thereof is not limited to a particular scale.

In any case, in the present embodiment, basically, the moving image reproduction apparatus 10 requests the moving image distribution server 12 to distribute a moving image, on the basis of a user operation, and the moving image distribution server 12 distributes the requested moving image by streaming. To that extent, the communication protocol to be used, the form of the moving image reproduction apparatus 10, the configuration of the moving image distribution server 12, and the like are not limited to particular ones. For example, the moving image distribution server 12 may distribute a recorded moving image or distribute a moving image being captured or created, live. At this time, the moving image distribution server 12 may be connected to another content providing server, may acquire data of a moving image, and may then transmit the data to the moving image reproduction apparatus 10.

Figure 2:
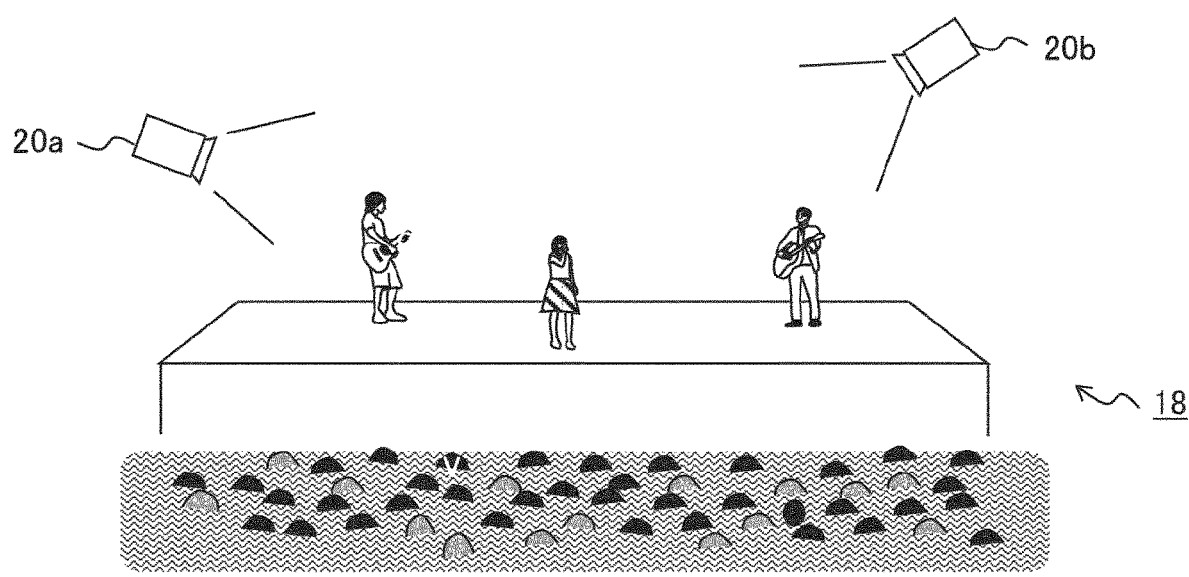
FIG. 2 is a diagram for describing an example of a moving image distributed to a moving image reproduction apparatus by streaming in the present embodiment.

FIG. 2 is a diagram for describing an example of a moving image distributed to the moving image reproduction apparatus 10 by streaming in the present embodiment. In this example, it is assumed that a plurality of cameras 20a and 20b are provided in a concert venue 18 and capture what is taking place in a concert from different directions for distribution of the moving image. For example, the plurality of cameras 20a and 20b capture images of the concert from the start to the end thereof in parallel, so that a plurality of moving images having different fields of view are acquired on a common time axis.

The moving image distribution server 12 distributes any one of such a plurality of moving images to the moving image reproduction apparatus 10 and also accepts an operation for switching a distribution target to a moving image having a different field of view, from the moving image reproduction apparatus 10 as needed. That is, in the present embodiment, it is possible to switch the display to an image with a different field of view at a desired timing during the reproduction of a moving image. Accordingly, a user who is watching the moving image on the moving image reproduction apparatus 10 side can freely switch between, for example, a moving image mainly capturing a performer whom the user wants to see and a moving image capturing the entire venue in a bird's-eye view, according to the progress of the concert or the like.

It is noted that, as long as the moving images represent the same space with different fields of view, the display target and the display purpose are not limited to specific ones. For example, the display target may be a video of a sports competition, an event of any kind, or the like, instead of the concert video illustrated in FIG. 2. The display target is not limited to a live-action image and may be computer graphics representing a virtual space with different fields of view or the like. Further, as long as synchronization is ensured on a common time axis, a moving image may be switched to the one with a different field of view only for a part of a period of time, and the number of moving images that can be switched is not limited.

Figure 3:
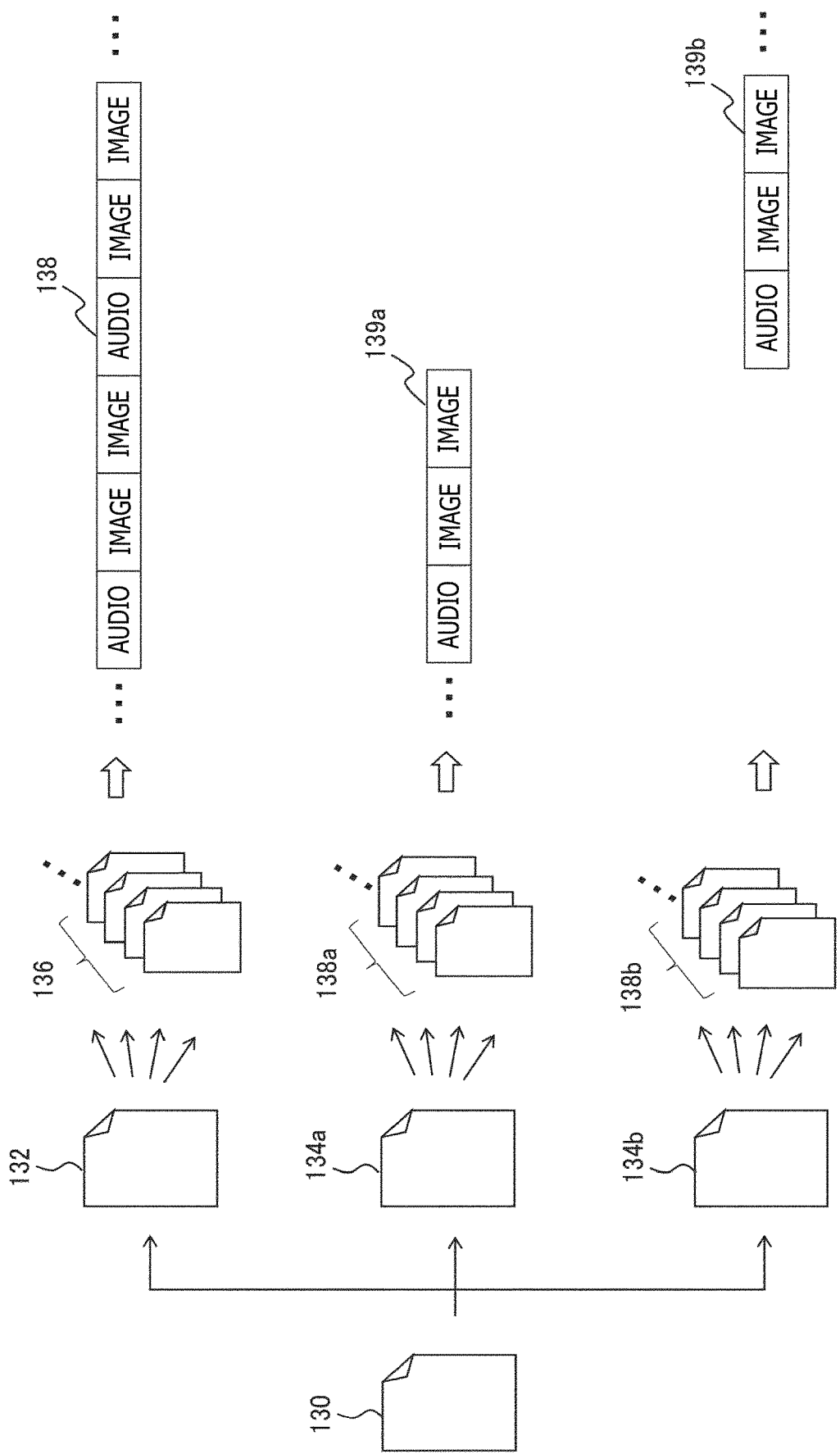
FIG. 3 is a diagram for describing data structures of moving images to be distributed in the present embodiment.

FIG. 3 is a diagram for describing data structures of moving images to be distributed in the present embodiment. It is noted that, in the following description, a "moving image" is assumed to include an image and audio. Further, a group of a plurality of moving images that can be switched will be referred to as "content." As described above, in the present embodiment, a plurality of moving images that have different fields of view and that represent one space are prepared to change the field of view displayed on the moving image reproduction apparatus 10, at a desired timing. At this time, even if the image being displayed is switched to another image, audio associated with one moving image continues to be output. In this way, seamless switching is performed.

For example, a moving image for audio reproduction and a plurality of moving images for display are prepared separately, and audio of the moving image for audio reproduction is output while any of the moving images for display is displayed. In response to a field-of-view switching operation, the display target is switched to any of the moving images for display. Alternatively, any one of the plurality of moving images for display may also be used for audio reproduction. The following description mainly focuses on the mode in which a moving image for audio reproduction is separately prepared. In this case, since the image itself of this moving image is not displayed, the data size can be suppressed with the image represented at a low bit rate.

Meanwhile, each moving image is prepared to have a similar data structure regardless of whether it is for display or for audio reproduction. In this way, the moving image distribution server 12 can transmit data by using a protocol similar to the one conventionally used. Here, data of each moving image is divided per a predetermined period of time in a range of approximately several seconds to several tens of seconds, and the data divided in this way is held and transmitted. Hereinafter, each piece of the divided data will be referred to as "segment data." For each moving image, the moving image distribution server 12 generates a plurality of pieces of segment data obtained by dividing the moving image and a playlist that is definition information of each piece of the segment data.

In FIG. 3, a playlist 132 of a moving image for audio reproduction defines the storage location, reproduction duration, reproduction order, and the like of each piece of segment data 136 for audio reproduction. Similarly, a playlist 134a of a moving image for display defines the storage location, reproduction duration, reproduction order, and the like of each piece of segment data 138a for display, and a playlist 134b of a moving image for display defines the storage location, reproduction duration, reproduction order, and the like of each piece of segment data 138b for display. In the case of a recorded moving image, each playlist is static data. In the case of a moving image being captured, new segment data is generated over time, and each playlist is updated accordingly.

Moreover, the moving image distribution server 12 generates an index file 130 which associates these moving images with each other and which defines them as single content. The index file 130 describes information related to each moving image, such as the details of the content, the storage locations of the playlists 132, 134a, and 134b of the plurality of moving images prepared as the content, and field-of-view information. As a technique for distributing moving images in a time-division manner, several standards such as HLS, MPEG-DASH, and CMAF have been put into practical use, and any of them may be employed in the present embodiment. It is to be understood by those skilled in the art that the names and description formats of files to be prepared vary depending on the standard.

In any case, in the present embodiment, the moving image distribution server 12 identifies and transmits data of a moving image for audio reproduction and data of a moving image for display with the requested field of view, by searching the index file 130 and the playlists 132, 134a, and 134b in the content specified by the moving image reproduction apparatus 10. Specifically, the moving image distribution server 12 first transmits a playlist of a required moving image to the moving image reproduction apparatus 10 and accepts a transmission request that specifies segment data corresponding to the required time from the playlist, thereby transmitting the segment data to the moving image reproduction apparatus 10.

Each piece of segment data includes image data and audio data per predetermined period of time. The moving image distribution server 12 packetizes segment data to be transmitted in chronological order and transmits the packet data. Specifically, as illustrated on the right side of FIG. 3, packets of image data and packets of audio data are sequentially transmitted in the form of a multiplexed stream. In the present embodiment, in particular, while a data string (stream) 138 of a moving image for audio reproduction is continuously transmitted, switching is performed between data strings 139a and 139b of moving images for display according to the switching operation by the user, and the one after switching is transmitted.

Figure 4:
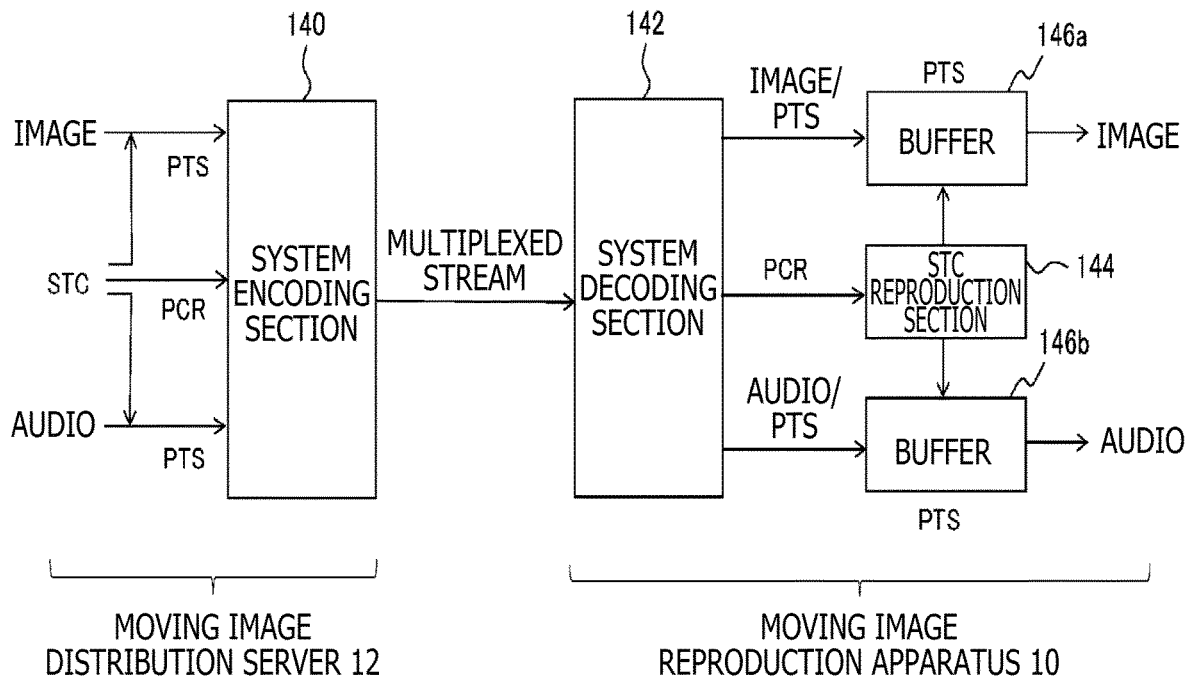
FIG. 4 is a diagram illustrating a configuration of a system for performing synchronization between images and audio.

Meanwhile, when the moving image reproduction apparatus 10 sequentially acquires packets of the requested moving image, the moving image reproduction apparatus 10 outputs images and audio in synchronization with each other such that the images and the audio are not shifted from each other. In the present embodiment, images and audio of different moving images are output in combination with each other, and the synchronization therebetween can be performed by using a conventional method for synchronizing images and audio of a single moving image. FIG. 4 illustrates a configuration of a system for performing synchronization between images and audio. First, the moving image distribution server 12 generates a PTS (Presentation Time Stamp) that defines the output timing of an image and audio, on the basis of its own STC (System Time Clock), and gives the PTS to each piece of segment data.

The moving image distribution server 12 also generates a PCR (Program Clock Reference) which represents a counter value at a predetermined cycle based on the STC. A system encoding section 140 of the moving image distribution server 12 generates a multiplexed stream that includes a packet string including image and audio segment data, the PTS of each piece of the segment data, and the PCR with the predetermined cycle, and transmits the multiplexed stream to the moving image reproduction apparatus 10. A system decoding section 142 of the moving image reproduction apparatus 10 separates the data from the transmitted multiplexed stream. Then, an STC reproduction section 144 adjusts the frequency of an oscillator to associate the reception time of each packet with the counter value indicated by the PCR, thereby reproducing the STC.

In this way, the moving image reproduction apparatus 10 performs the operation on the common time axis shared with the moving image distribution server 12. Specifically, the moving image reproduction apparatus 10 adjusts the output timing of each piece of data by using buffers 146a and 146b to output an image and audio corresponding to each other, on the basis of the PTS on this time axis. As long as the PTS on the same time axis is given to all the moving images constituting one piece of content, the moving image reproduction apparatus 10 can adjust the output timing on the basis of the PTS. Accordingly, the image and the audio can be output to the display 16 without a shift from each other even if they are from different moving images. It is noted that, in FIG. 4, the illustration of a data encoding process and a data decoding process is omitted.

Figure 5:
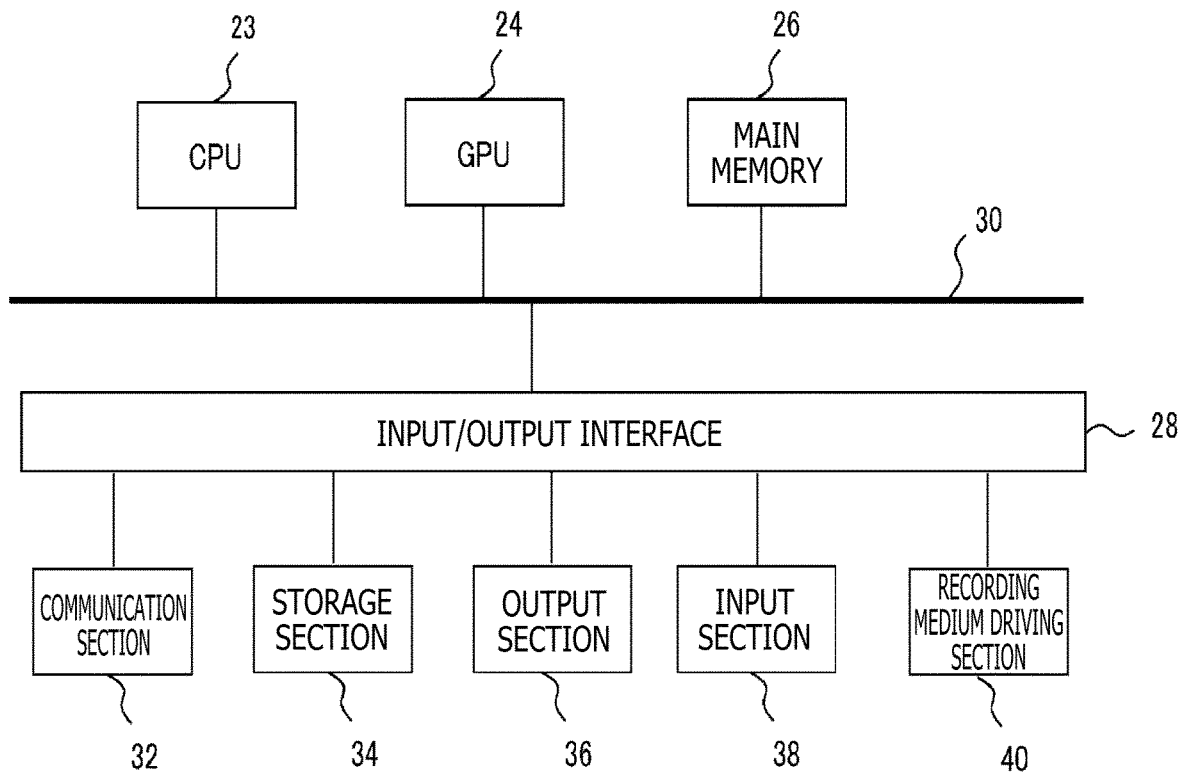
FIG. 5 is a diagram illustrating an internal circuit configuration of the moving image reproduction apparatus according to the present embodiment.

FIG. 5 illustrates an internal circuit configuration of the moving image reproduction apparatus 10. The moving image reproduction apparatus 10 includes a CPU (Central Processing Unit) 23, a GPU (Graphics Processing Unit) 24, and a main memory 26. These units are connected to each other via a bus 30. In addition, an input/output interface 28 is connected to the bus 30. The input/output interface 28 is connected to a communication section 32, a storage section 34, an output section 36, an input section 38, and a recording medium driving section 40. The communication section 32 includes peripheral device interfaces such as a USB (Universal Serial Bus) and IEEE (Institute of Electrical and Electronics Engineers) 1394 and a wired or wireless LAN network interface, and establishes communication with the moving image distribution server 12. The storage section 34 includes a hard disk drive, a non-volatile memory, and the like. The output section 36 outputs data to the display 16. The input section 38 receives data from the input apparatus 14. The recording medium driving section 40 drives a removable recording medium such as a magnetic disk, an optical disc, or a semiconductor memory.

The CPU 23 controls the entire moving image reproduction apparatus 10 by executing an operating system stored in the storage section 34. The CPU 23 also executes various programs that are read from the removable recording medium and loaded into the main memory 26 or that are downloaded via the communication section 32. The GPU 24 has a geometry engine function and a rendering processor function. The GPU 24 performs a drawing process according to a drawing order from the CPU 23 and outputs the result of the drawing process to the output section 36. The main memory 26 includes a RAM (Random Access Memory) and stores programs and data necessary for processing. It is noted that the moving image distribution server 12 may have a similar circuit configuration.

Figure 6:
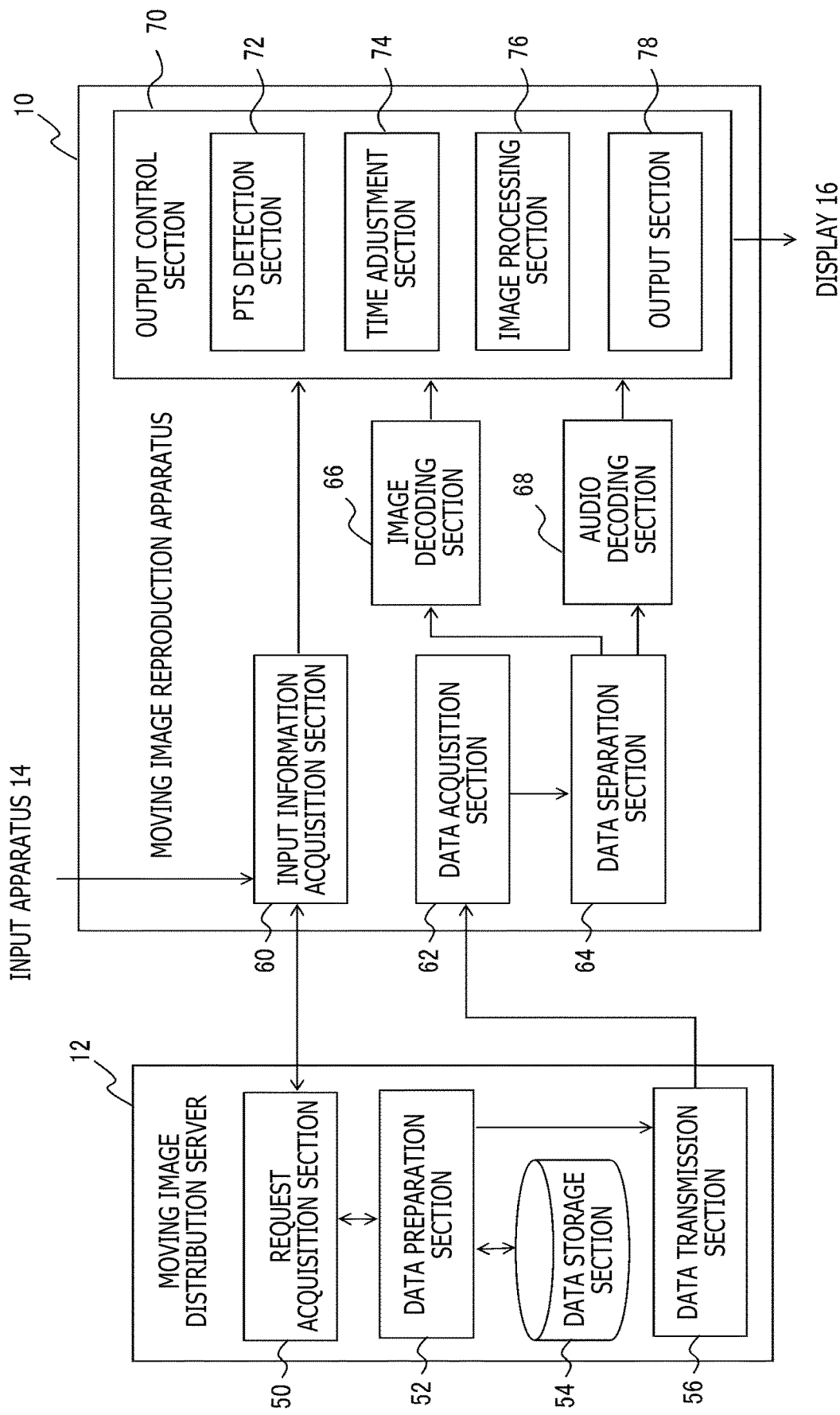
FIG. 6 is a diagram illustrating a configuration of functional blocks of the moving image reproduction apparatus and a moving image distribution server in the present embodiment.

FIG. 6 illustrates a configuration of functional blocks of the moving image reproduction apparatus 10 and the moving image distribution server 12. Individual functional blocks illustrated in FIG. 6 can be implemented as hardware by the CPU 23, the GPU 24, the main memory 26, and/or the like illustrated in FIG. 5, and are implemented as software by programs that are loaded into the memory from a recording medium and that execute various functions such as an information processing function, an image drawing function, a data input/output function, and a communication function. Therefore, it is to be understood by those skilled in the art that these functional blocks can be implemented in various forms by hardware only, software only, or a combination of hardware and software and are not limited to any of these forms.

The moving image distribution server 12 includes a request acquisition section 50, a data preparation section 52, a data storage section 54, and a data transmission section 56. The request acquisition section 50 acquires a request from the moving image reproduction apparatus 10. The data preparation section 52 prepares data according to the request. The data storage section 54 stores content data. The data transmission section 56 transmits the prepared data to the moving image reproduction apparatus 10. The request acquisition section 50 acquires a moving image transmission request that includes changing of the display target, from the moving image reproduction apparatus 10. Therefore, the request acquisition section 50 may transmit information necessary for the selection of a moving image, such as selectable content and information relating to field of views of images representing the selectable content, to the moving image reproduction apparatus 10 in advance.

The data preparation section 52 cooperates with the request acquisition section 50 to prepare data according to the details of the request acquired from the moving image reproduction apparatus 10. For example, the data preparation section 52 acquires an index file corresponding to the selected content and identifies image (field of view) options representing the content. When this information is given to the request acquisition section 50, the request acquisition section 50 further acquires a transfer request for a moving image with a specified field of view, from the moving image reproduction apparatus 10. In response to this transfer request, the data preparation section 52 acquires a corresponding playlist and transmits the playlist to the moving image reproduction apparatus 10 via the request acquisition section 50 to accept a request for necessary segment data.

For example, in the case where a moving image is reproduced from the beginning, the data preparation section 52 acquires segment data of a moving image for audio reproduction and segment data of a moving image for display with the field of view specified by the moving image reproduction apparatus 10, in order from the first ones listed in the respective playlists. In the case where the display target is changed during the reproduction, the data preparation section 52 continues to acquire subsequent segment data of the moving image for audio reproduction while acquiring segment data of a moving image for display to which the display target has been switched. The segment data acquired here is data after the corresponding time and is described in the playlist of the moving image to which the display target has been switched.

As illustrated in FIG. 3, the data storage section 54 stores, for each piece of content, an index file, playlists of a plurality of moving images, and their segment data. Here, it is assumed that each piece of data is appropriately compressed and encoded. Further, in the case of moving images being captured, data of the moving images is updated as needed. However, the illustration of the updating means is omitted herein. A moving image that is the source of data may be acquired from another server or the like, not illustrated, and the acquisition timing thereof is not limited to a particular timing.

The data transmission section 56 sequentially packetizes segment data prepared by the data preparation section 52 and transmits the segment data to the moving image reproduction apparatus 10. At this time, the data transmission section 56 gives a PTS to image and audio data in predetermined units such as units of segment data as described above and also periodically gives the PCR thereto. In addition, the data transmission section 56 may appropriately give, to image and audio data, information given in a general streaming transfer to the data transmission section 56.

The moving image reproduction apparatus 10 includes an input information acquisition section 60, a data acquisition section 62, a data separation section 64, an image decoding section 66, an audio decoding section 68, and an output control section 70. The input information acquisition section 60 acquires the details of a user operation. The data acquisition section 62 acquires a stream of a moving image. The data separation section 64 separates data from the stream. The image decoding section 66 decodes image data. The audio decoding section 68 decodes audio data. The output control section 70 controls the output of the moving image. The input information acquisition section 60 acquires, from the input apparatus 14, the details of the user operation such as selection of content, selection of a display image, and changing of the display target during the reproduction, and requests necessary data from the moving image distribution server 12.

As described above, the input information acquisition section 60 may acquire information related to selectable content and images representing the selectable content, from the moving image distribution server 12 in advance, and cause the display 16 to display the information as options via the output control section 70. The input information acquisition section 60 also acquires a moving image for audio reproduction and a playlist of a moving image selected for display, from the moving image distribution server 12, and requests segment data corresponding to the time when a reproduction start operation or a display switching operation is performed, from the moving image distribution server 12.

According to the user operation, the data acquisition section 62 continuously acquires data of moving images transferred from the moving image distribution server 12 by streaming. The data includes data of a moving image for audio reproduction and data of a moving image for display. A stream of each moving image includes image data and audio data to which a PTS is given in the predetermined units. The data separation section 64 separates such multiplexed data per moving image and further separates the data into image data and audio data. A stream transmitted from the moving image distribution server 12 includes information for identifying the data. A method that has conventionally been put into practical use can be applied to the data separation by using such information.

The image decoding section 66 decodes, among the pieces of separated data, the image data included in the display target moving image selected by the user. The audio decoding section 68 decodes, among the pieces of separated data, the audio data included in the moving image for audio reproduction. The output control section 70 sequentially outputs the decoded images and audio to the display 16 at an appropriate timing. Specifically, the output control section 70 includes a PTS detection section 72, a time adjustment section 74, an image processing section 76, and an output section 78. The PTS detection section 72 detects the PTS given to the output target image data and audio data.

The time adjustment section 74 adjusts the output timing such that a shift between images and audio does not occur. In a general streaming transfer, as illustrated in FIG. 4, image data and audio data are transmitted at substantially the same time and are basically output immediately except for adjustment of a slight time difference between packets. By contrast, the present embodiment allows images and audio included in different moving images to be output in synchronization with each other and also allows the image being displayed to be switched to an image included in a different moving image, during the reproduction. During this switching as well, it is ensured that, while synchronization between the images and the audio is maintained, images are as seamless as possible before and after the switching. In this way, it is possible to express continuity as one piece of content.

Therefore, the time adjustment section 74 delays the output of audio of a moving image for audio reproduction by a predetermined period of time from the timing of acquisition of the data from the moving image distribution server 12, and then outputs an image such that the image corresponds to the PTS of the audio. This configuration can reduce the difference between the PTS of an image being displayed when the image switching operation is performed and the PTS of a top image to which the display has been switched and which has been transmitted from the moving image distribution server 12, and can also ensure that a shift between the audio that continues to be output and the top image does not occur. Specific examples of the time adjustment will be described later.

According to the image switching operation, the image processing section 76 performs processing of fading out an image being displayed and fading in an image that has been switched from the image. This realizes a seamless display transition according to the switching operation. The output section 78 outputs an image included in a moving image for display, to the display panel of the display 16 while outputting audio of a moving image for audio reproduction to the speaker of the display 16.

Figure 7:
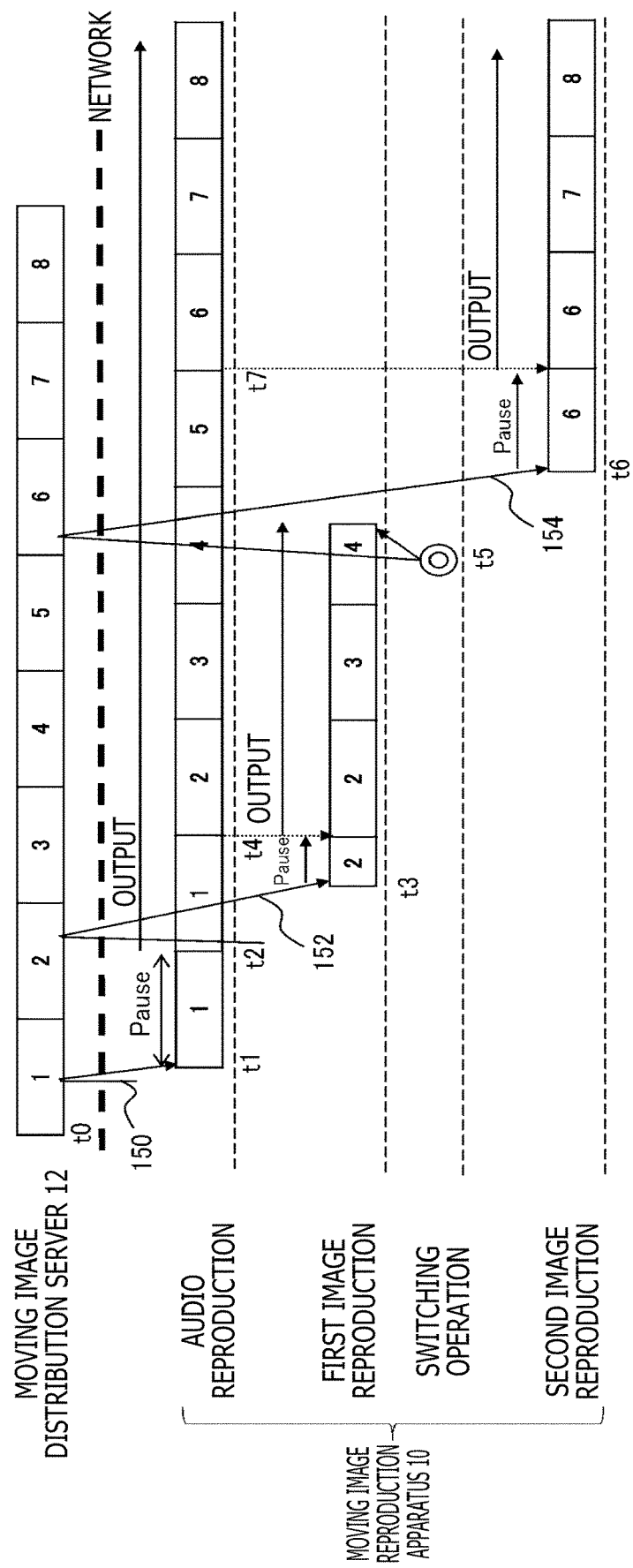
FIG. 7 is a diagram exemplifying a flow of image and audio output in the present embodiment.

FIG. 7 exemplifies a flow of image and audio output in the present embodiment. The horizontal direction in FIG. 7 represents the passage of time, and each rectangle represents the time length of segment data. A number depicted in each rectangle represents a PTS. Although identical PTSs are simply represented by a natural number of the same value, an actual PTS format is not limited thereto. The uppermost stage represents a flow of moving image data being reproduced in the moving image distribution server 12. Pieces of segment data of all the moving images representing one piece of content are similarly given common PTSs with respect to the system clock.

A moving image reproduced in this way is distributed to a plurality of moving image reproduction apparatuses 10 in parallel. Here, when one moving image reproduction apparatus 10 requests the moving image distribution at the timing of an arrow 150, the moving image distribution server 12 starts transmitting moving image data from a PTS "1" segment which is being reproduced at the time of the reception of the request. In the illustrated example, only data of a moving image for audio reproduction is transmitted first. Depending on the timing of the transmission request, the data transfer, the decoding process, and the like, time t1 at which the moving image reproduction apparatus 10 can output segment data given the PTS "1" is delayed from time t0 at which the moving image distribution server 12 has started reproducing the corresponding data.

In a conventional technique, audio and an image are immediately output at the time t1 at which the output becomes possible. However, the time adjustment section 74 in the present embodiment pauses the audio output in the state in which the output is possible. Then, at time t2 after a predetermined period of time has elapsed, the time adjustment section 74 cancels the pause and causes the output to start. In this example, the pause duration (t2-t1) corresponds to the duration of one piece of segment data, for example, three seconds. In this way, extra time is given until the output of the audio, and thus, when the display image is changed at a later time, an image to which the display has been switched can be output in time for the audio.

In the illustrated example, the moving image distribution server 12 first transmits only the moving image data for audio output, so that only the audio given the PTS "1" is output from the moving image reproduction apparatus 10 at the time t2. If the moving image reproduction apparatus 10 requests a moving image for first display here, data of the moving image for display is transmitted from a PTS "2" segment, which is being reproduced at that time, as indicated by an arrow 152. As for the moving image for display as well, time t3 at which a top image given the PTS "2" can be output is delayed from the time at which the moving image distribution server 12 has started reproducing the corresponding data, due to the timing of the transmission request, the data transfer, the decoding process, and the like.

Meanwhile, since the moving image reproduction apparatus 10 has delayed the audio output of the PTS "1" segment by the predetermined period of time, the time t3 comes earlier than time t4 at which the output of the audio data given the PTS "2" starts. Therefore, in the state in which the output of a first image given the PTS "2" becomes possible, the time adjustment section 74 pauses the output thereof. At the time t4 at which the output of the audio data given the PTS "2" starts, the time adjustment section 74 causes the output of the first image given the same PTS "2" to start. Accordingly, even though the original moving image data is different between the image and the audio, the moving image can be represented without any shift between the image and the audio. Further, as illustrated in FIG. 7, even though the image data is acquired at a later time, the image data can be output in time for the audio being output ahead.

It is noted that, at the start of the image output, the image processing section 76 fades in an image to reduce the feeling of abruptness. Assume that, while an image and audio are output in this way, the user performs an operation for switching the display to a different image at time t5. In this case, the moving image reproduction apparatus 10 stops outputting the first image that has been displayed up to that point, at an appropriate timing, while requesting a newly selected moving image for second display from the moving image distribution server 12. At this time, the image processing section 76 fades out the first image.

In the illustrated example, an image given a PTS "4" fades out. Meanwhile, as indicated by an arrow 154, the moving image distribution server 12 transmits data of the moving image for display to which the display has been switched, from a PTS "6" segment being reproduced at the time of the request. Here as well, since the moving image reproduction apparatus 10 has delayed the audio output of the PTS "1" segment by the predetermined period of time, time t6 at which the output of a top image given the PTS "6" in the second moving image is possible comes earlier than time t7 at which the output of audio data given the PTS "6" starts.

Therefore, the time adjustment section 74 pauses the output of a second image given the PTS "6" until the time t7 at which the output of the audio data given the PTS "6" starts. Then, at the time t7, the time adjustment section 74 cancels the pause, and the image processing section 76 and the output section 78 start outputting the second image given the PTS "6" by fading in the second image. The same applies hereinafter. Each time the display target switching operation is performed, an image being displayed is faded out, and the output of an image that has been switched from the image is paused in the state in which the output thereof is possible. Then, the image is faded in after waiting for the output of audio given the same PTS.

Figure 8:
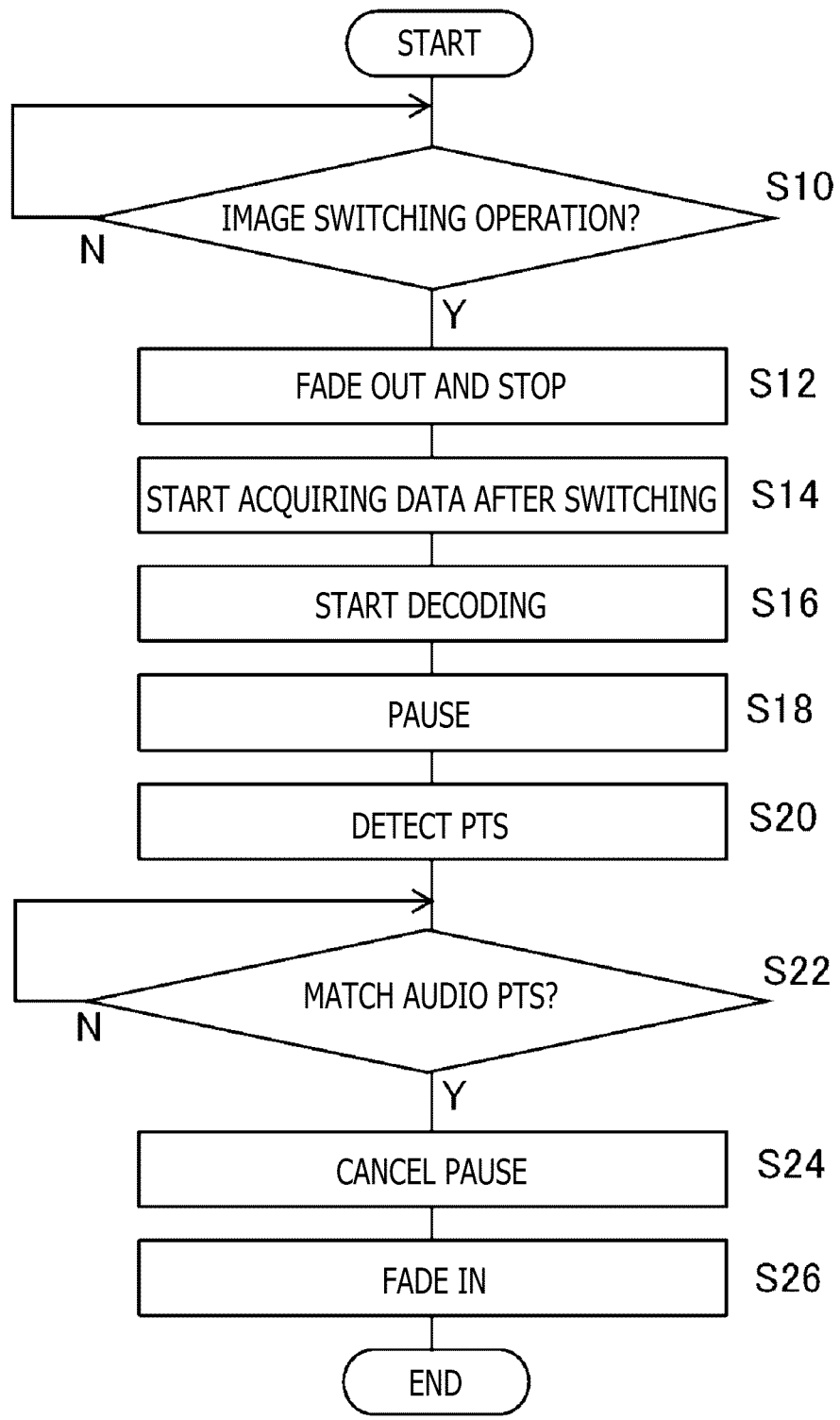
FIG. 8 is a flowchart illustrating a processing procedure of the moving image reproduction apparatus when a display image is changed in the present embodiment.

FIG. 8 is a flowchart illustrating a processing procedure of the moving image reproduction apparatus 10 when the display image is changed. This flowchart starts in the state in which audio obtained from a moving image for audio reproduction and an image obtained from a moving image for display are output to the display 16. In this state, the input information acquisition section 60 waits for the user operation for changing the display image (N in S10). When the user operation is performed (Y in S10), the output control section 70 fades out an image being output and stops the output thereof (S12).

Meanwhile, the input information acquisition section 60 requests the moving image distribution server 12 to change the moving image for display that is to be transmitted, and then, the data acquisition section 62 starts acquiring data, among pieces of data of a moving image that has been switched from the moving image, from the segment being reproduced at the time of the request in the moving image distribution server 12 (S14). Then, the image decoding section 66 starts decoding segment data of the image extracted from the moving image data (S16). The output control section 70 pauses the output of the decoded image (S18) and detects the PTS thereof (S20).

Then, the output control section 70 compares the detected PTS with the PTS of the audio being output. While these PTSs are different, the output control section 70 keeps pausing the image output (N in S22). As a result, there is a possibility that a blackout state in which nothing is displayed on the display 16 occurs for a short period of time. When the PTSs match (Y in S22), the output control section 70 cancels the pause of the image output (S24) and displays the image by fading in the image (S26). It is noted that, strictly speaking, the timing at which the PTSs of the image and the audio match may be predicted and the cancellation of the pause in S24 may be performed immediately before this timing.

In the mode illustrated in FIG. 7, the period in which the audio output is delayed is fixed to the duration of one segment. According to this control method, a shift of at least one segment occurs between the reproduction time in the moving image distribution server 12 and the display time in the moving image reproduction apparatus 10. This guarantees that the top of the image data that has been switched from another image and that is transmitted from the moving image distribution server 12 is a segment subsequent to the segment being displayed at the time of the switching operation. As a result, it is possible to prevent the start of the display of an image that has been switched from another image, from being delayed from audio.

Figure 9:
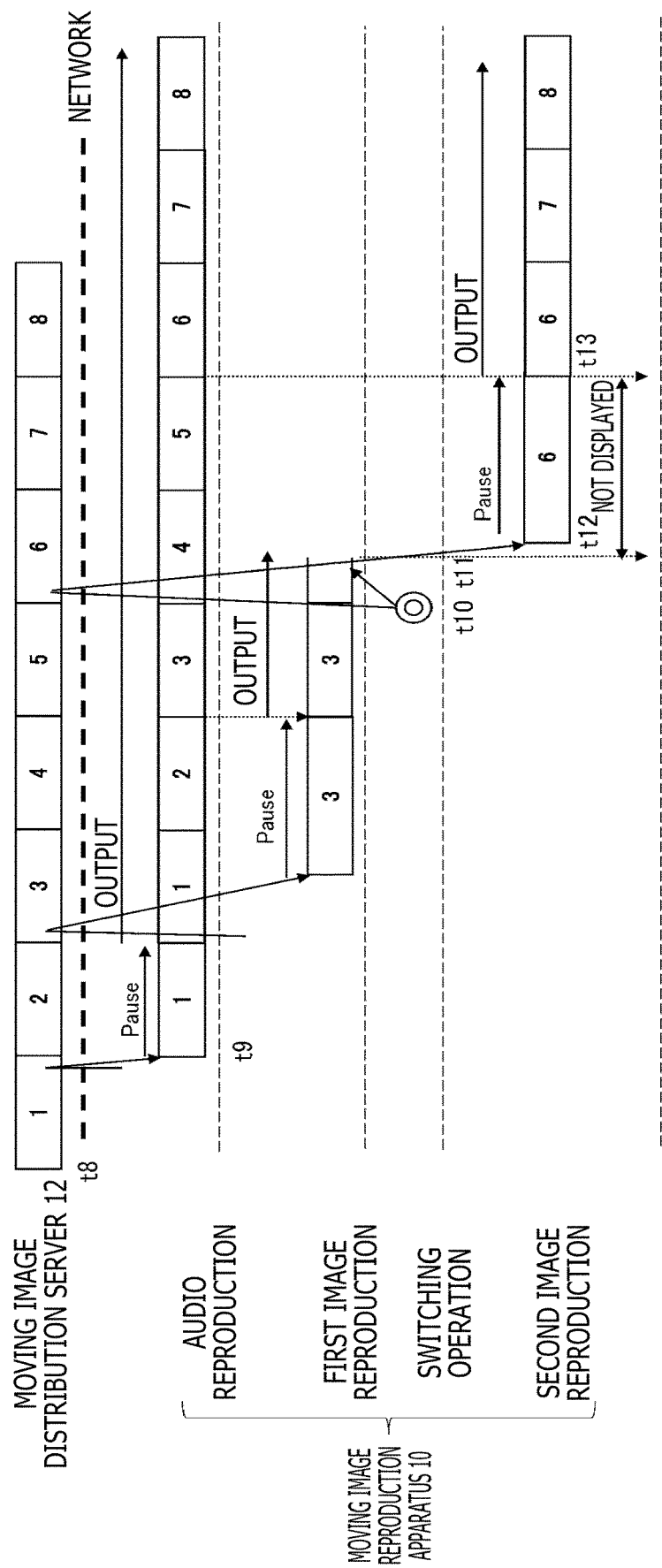
FIG. 9 is a diagram exemplifying a flow of the image and audio output in the case where switching takes time in the control method of FIG. 7.

On the other hand, in this control method, there is a possibility that a shift more than necessary occurs between the reproduction time in the moving image distribution server 12 and the display time in the moving image reproduction apparatus 10 depending on the timing of the display start operation, and this may create extra waiting time until the display of the image that has been switched from another image starts. FIG. 9 exemplifies a flow of the image and audio output in the case where the switching operation takes time in the control method of FIG. 7. Although the representation of FIG. 9 is similar to that of FIG. 7, in this example, the delay of the output time in the moving image reproduction apparatus 10 is larger than that of the case of FIG. 7 with respect to the reproduction time of the moving image in the moving image distribution server 12.

The magnitude of such a shift varies depending on the timing at which the display start operation is performed. That is, in the case of FIG. 9, since the start operation is performed just before the reproduction of the PTS "1" segment ends in the moving image distribution server 12, time t9 at which the moving image reproduction apparatus 10 can output data of the segment is already delayed by approximately one segment from the reproduction start time t8 in the moving image distribution server 12. Even in such a case, if the audio output starts after the fixed delay time of one segment is further given, the reproduction of the moving image in the moving image reproduction apparatus 10 is consequently shifted by two segments from the reproduction of the moving image in the moving image distribution server 12.

For example, when the image switching operation is performed at time t10, the PTS "4" segment among first images is displayed in the moving image reproduction apparatus 10, whereas the PTS "6" segment, which is two segments after the PTS "4" segment, is reproduced in the moving image distribution server 12. Therefore, the moving image reproduction apparatus 10 has no choice but to acquire data from the PTS "6" segment among the pieces of second moving image data to which the display has been switched. As a result, the period from time t12 at which the output of the image becomes possible to time t13 at which the output of audio data given the PTS "6" starts is longer than the duration of one segment.

Since the display of the first image that is to be switched to the second image has already stopped at time t11 before the time t12, the blackout state in which nothing is displayed continues for a relatively long period of time from the time t11 to the time t13. Conceivably, one of the measures to avoid such a situation is that an image other than the image being displayed is set to an outputtable state at any time in units of segments.

Figure 10:
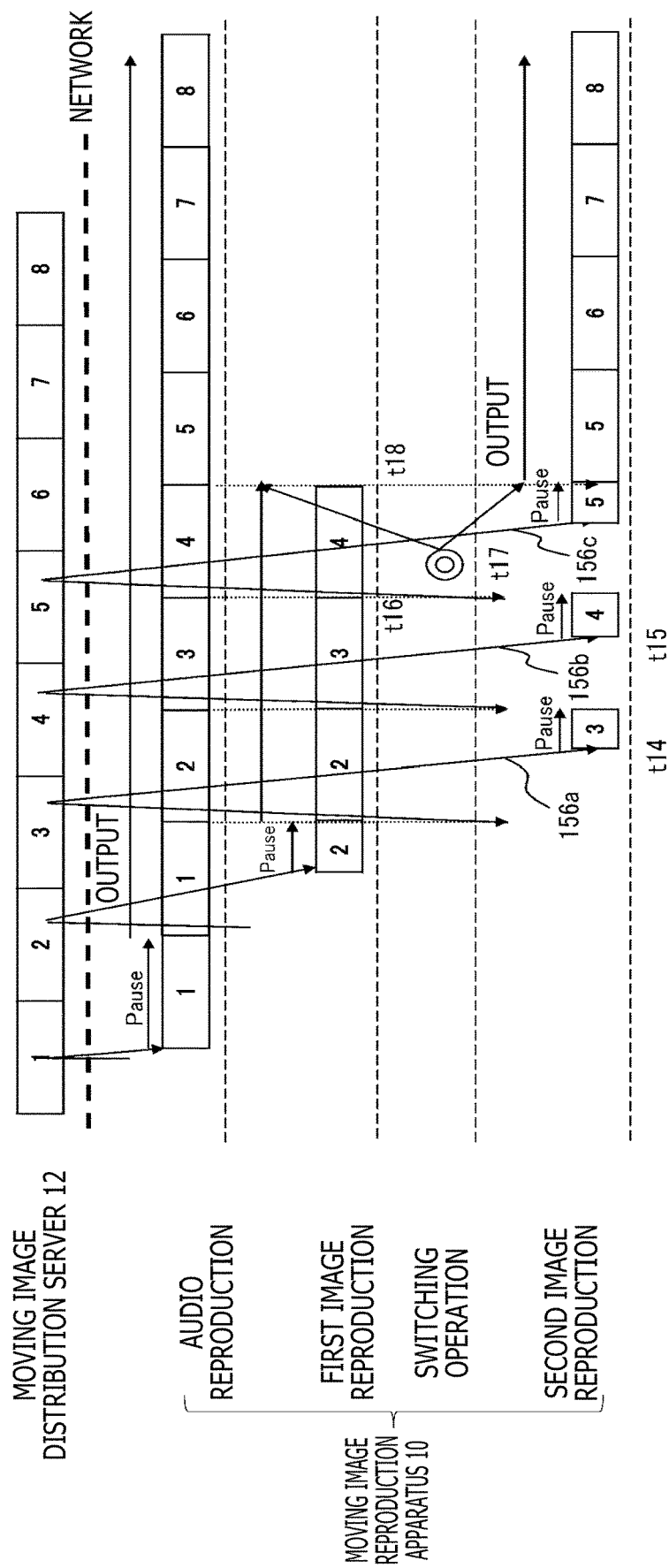
FIG. 10 is a diagram exemplifying a flow of the image and audio output in the case where an image other than an image being displayed is in an outputtable state at any time in the present embodiment.

FIG. 10 exemplifies a flow of the image and audio output in the case where an image other than the image being displayed is in an outputtable state at any time. The representation of FIG. 10 is similar to that of FIG. 7. Further, FIG. 10 is similar to FIG. 7 in the following flow. Specifically, moving image data for audio reproduction is acquired from the moving image distribution server 12, audio is output after the predetermined delay time has elapsed, data of the moving image for first display is acquired, and then, the first image output starts at a timing corresponding to the audio. By contrast, in this control method, a moving image for second display is also acquired in parallel regardless of the image switching operation.

That is, as indicated by arrows 156a, 156b, and 156c, at the timing of the changing of the segment of the moving image being output, the input information acquisition section 60 of the moving image reproduction apparatus 10 requests the moving image distribution server 12 to transmit, in units of segments, the moving image for second display not being displayed. Then, the moving image reproduction apparatus 10 continues to output the first images unless the image switching operation is performed. At the same time, the moving image reproduction apparatus 10 speculatively decodes second image data such that the output thereof is possible.

In the illustrated example, a top image given a PTS "3" among second images can be output at time t14, and a top image given the PTS "4" can be output at time t15. The output of each image is paused until the output of audio given the same PTS starts, and the data is discarded unless the user operation for switching images is performed during the output period of the segment immediately before that. If the switching operation is performed during the output period of the segment immediately before the PTS of the second image being paused, the pause is canceled, and the output of this second image starts.

In the illustrated example, data given a PTS "5" among the second images is paused. Meanwhile, the image switching operation is performed at time t17 in the period between t16 and t18 that is the output period of first images given the PTS "4," which is immediately before the PTS "5." Accordingly, at time t18, second image data given the PTS "5" is not discarded but output. In this case as well, the output control section 70 fades out and stops an image given the PTS "4" among the first images that are to be switched to the second image, and then fades in the second image that has been switched from the first image.

In this way, data of a moving image that is not the display target is acquired in parallel, and a top image is prepared for each segment at any time. With this configuration, the switching can be performed at the top of each segment regardless of an output time shift between the moving image distribution server 12 and the moving image reproduction apparatus 10. As a result, the time required for switching can be minimized. On the other hand, in this method, as the number of moving images representing one piece of content increases and the image resolution increases, the load on the data transfer and the decoding process increases. Therefore, suitably, whether or not to apply this method is decided depending on the number of moving images to be selected, the communication environment, the processing performance of the moving image reproduction apparatus 10, and the like.

Figure 11:
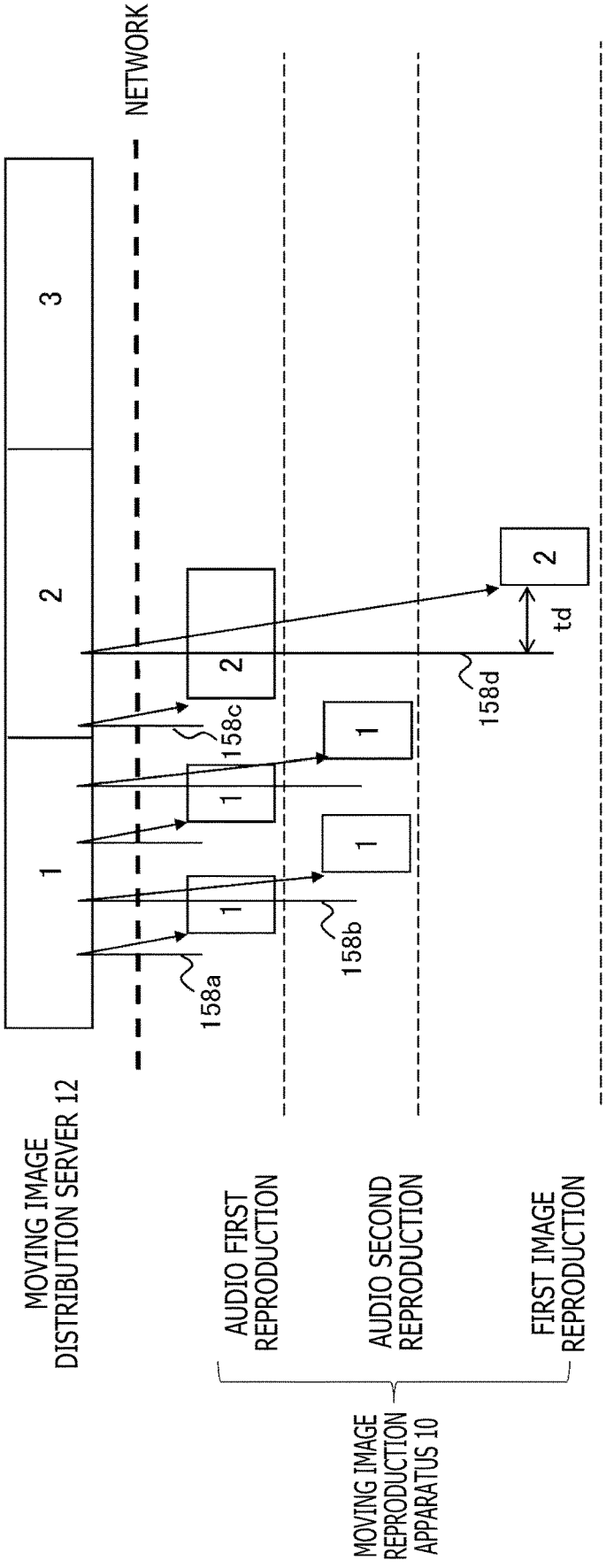
FIG. 11 is a diagram exemplifying a flow of the image and audio output in the case where a delay time given to the audio output is adaptively decided in the present embodiment.
Figure 12:
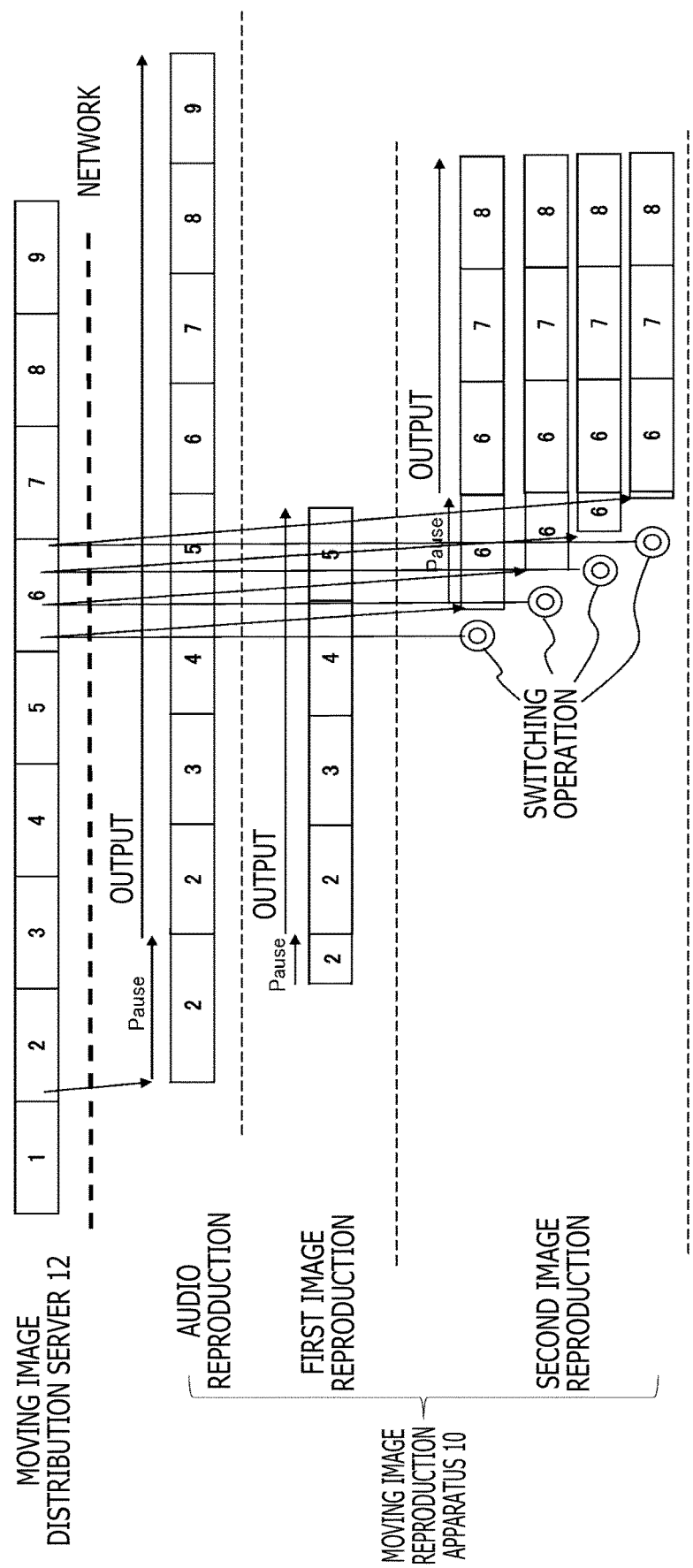
FIG. 12 is a diagram exemplifying a flow of the image and audio output in the case where a delay time given to the audio output is adaptively decided in the present embodiment.

As another example of the measures to minimize the switching time, it is conceivable to adaptively decide the delay time to be given to the audio output. FIGS. 11 and 12 each exemplify a flow of the image and audio output in the case where the delay time to be given to the audio output is adaptively decided. The representation of FIGS. 11 and 12 is similar to that of FIG. 7. In this method, as initial processing, the fastest timing at which top data of a segment can be acquired and the time taken from a request of a moving image for display until the output thereof becomes possible are actually measured.

Therefore, as illustrated in FIG. 11, the moving image reproduction apparatus 10 prepares a plurality of functional blocks. Each of the functional blocks requests a moving image for audio reproduction, decodes audio data thereof, and detects the PTS thereof. That is, a plurality of sets of functional blocks including the input information acquisition section 60, the data acquisition section 62, the data separation section 64, the audio decoding section 68, the PTS detection section 72, and the time adjustment section 74 are provided. Accordingly, the unit of detection of the fastest PTS switching timing in the moving image reproduction apparatus 10 is subdivided. In the illustrated example, two sets of functional blocks are prepared and are referred to as "audio first reproduction" and "audio second reproduction."

First, when the block that performs the audio first reproduction requests data of a moving image for audio reproduction as indicated by an arrow 158a, the moving image distribution server 12 transmits data from the PTS "1" segment being reproduced at that time. The block that performs the audio first reproduction decodes and pauses the top of the data and detects the PTS thereof. In the meantime, the block that performs the audio second reproduction requests data of a moving image for audio reproduction as indicated by an arrow 158b, and when the moving image distribution server 12 transmits segment data being reproduced at that time, the block that performs the audio second reproduction decodes and pauses the top of the segment data and detects the PTS thereof.

In the illustrated example, the PTS detected at this point is also "1." If this processing is alternately repeated, the detected PTS is eventually switched. In FIG. 11, the PTS has been switched to "2" in the data transmitted according to a request of an arrow 158c. The functional blocks for the audio first reproduction and the audio second reproduction repetitively request the next data while discarding the paused audio data until PTS switching occurs. With two or more such functional blocks, the switching timing can be detected in smaller units.

Moreover, the moving image reproduction apparatus 10 requests a moving image for display from the moving image distribution server 12 as indicated by an arrow 158d and acquires segment data being reproduced at the time of the request, from the moving image distribution server 12. In FIG. 11, data given the PTS "2" is transmitted. The image decoding section 66 of the moving image reproduction apparatus 10 starts decoding the transmitted data, and the output control section 70 pauses the output of a top image in the state in which the output thereof is possible. At this time, the time adjustment section 74 measures a time td taken from the data request to the moving image distribution server 12 until the image output becomes possible, by using an internal timer.

Although FIG. 11 illustrates only the initial processing, the moving image reproduction apparatus 10 subsequently performs a moving image output process as illustrated in FIG. 12. That is, through the initial processing, the moving image for audio reproduction can be acquired in the state in which the time difference between the moving image reproduction apparatus 10 and the moving image distribution server 12 is minimum. Therefore, the time adjustment section 74 pauses top data given the PTS "2," to stop it for a predetermined period of time. The stopped period at this time corresponds to a value obtained by adding the output duration of one piece of segment data to the time td taken from the data request until the image output becomes possible. The time td is acquired through the initial processing.

The moving image data for display is also acquired in the initial processing. The output section 78 uses and outputs an image that is given the PTS "2" and that is paused by the time adjustment section 74, together with the output of the audio given the PTS "2." According to this control method, switching can be performed at any time in a short period of time without preparing all the moving images that are not display targets, as illustrated in FIG. 10. That is, as illustrated in the "second image generation" in FIG. 10, during a period in which audio given the PTS before the switching is output, it is possible to complete preparing an image given the PTS after the switching, regardless of the timing of the display switching operation. Accordingly, the image can be output at the timing of switching to the next PTS.

In the illustrated example, as illustrated in the lowest stage, even though the switching operation is performed just before the end of the reproduction of the PTS "6" in the moving image distribution server 12, the moving image reproduction apparatus 10 can output an image that has been switched from another image, in time for the output of audio given the same PTS "6." Therefore, switching can be performed in the least amount of time with approximately the same processing load, regardless of the number of moving images constituting one piece of content and the level of resolution. It is noted that, in actual implementation, some margin may be added to the delay time provided for the audio output. Further, this example is similar to the above-described example in that the image processing section 76 performs, for example, fade-in and fade-out processing at the start and stop of the image display.

It is noted that, although the time td taken from the data request to the moving image distribution server 12 until the output of the data becomes possible is measured only for the images for first display in FIG. 11, the same measurement may be performed for all the moving images for display constituting the content. For example, it is conceivable that, in the case where the image sizes and bit rates of the moving images for display vary, the time taken from the data request until the output of the data becomes possible varies. In this case, the longest time td among the times td measured for individual moving images is employed and added to the delay time to be given to the audio output. In this way, it is possible to guarantee that an image that has been switched from another image is output in time for audio.

Moreover, even in the case where moving images are the same, it is conceivable that the time td taken from the data request to the moving image distribution server 12 until the output of the data becomes possible varies depending on the condition of the network 8. Therefore, the time td may be measured a plurality of times or measured regularly. Then, the longest time may be employed and added to the delay time to be given to the audio output. For example, if the condition of the network 8 deteriorates during a streaming transfer, the delay time of the audio output may be adjusted to be increased even during the moving image output, so that an image that has been switched from another image is output in time for audio. In this case as well, the measurement target may be one moving image or all the moving images.

Further, although the output duration of one segment included in the delay time to be given to the audio output can be acquired from a playlist transmitted from the moving image distribution server 12, the output duration can also be actually measured by the moving image reproduction apparatus 10. In this case, in the initial processing illustrated in FIG. 11, the PTS switching is detected twice, and the time difference between the two is acquired as the output duration of one segment. However, as the number of times of the measurement of the output duration and the time td taken from the data request to the moving image distribution server 12 until the output of the data becomes possible increases, the initial processing takes longer. Therefore, these values may be acquired in advance, so that it is only necessary to read out these values when the moving image is reproduced. In this way, the time taken to start the reproduction may be shortened.

Figure 13:
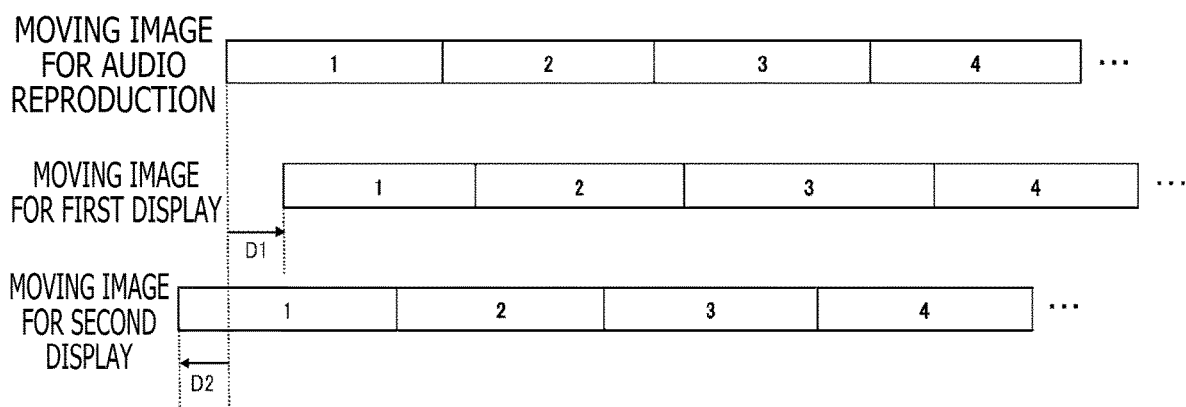
FIG. 13 is a diagram schematically illustrating an example in which time axes of a plurality of moving images constituting one piece of content are shifted from each other in the present embodiment.

In the description so far, it has been assumed that a plurality of moving images constituting one piece of content are completely synchronized. However, it is conceivable that, especially in the case of moving images captured by individual cameras, their time axes are slightly shifted from each other. FIG. 13 schematically illustrates an example in which the time axes of a plurality of moving images constituting one piece of content are shifted from each other. The horizontal axis in FIG. 13 represents the passage of time, and a flow of the reproduction duration of each of a moving image for audio reproduction, a moving image for first display, and a moving image for second display in the moving image distribution server 12 is illustrated. The length of each rectangle represents the reproduction duration of each PTS. In the illustrated example, with respect to the time axis of the moving image for audio reproduction, the moving image for first display is delayed by a period D1, and the moving image for second display is advanced by a period D2.

In the present embodiment, this time shift is acquired by the moving image distribution server 12. For example, utilizing the fact that audio of each moving image is common, the shift is measured by comparing the times taken to generate the same audio between the moving images. The moving image distribution server 12 stores, in a storage area accessible from the moving image reproduction apparatus 10, the amount of shift and the direction of shift of images of other moving images for display with respect to the audio of the moving image for audio reproduction, for example. The input information acquisition section 60 of the moving image reproduction apparatus 10 requests the moving image distribution server 12 to transmit information related to the time shift of all the moving images for display, together with data of the moving images, according to the content selection by the user. Then, the data acquisition section 62 acquires the information related to the time shift, in addition to streams of the moving images.

Figure 14:
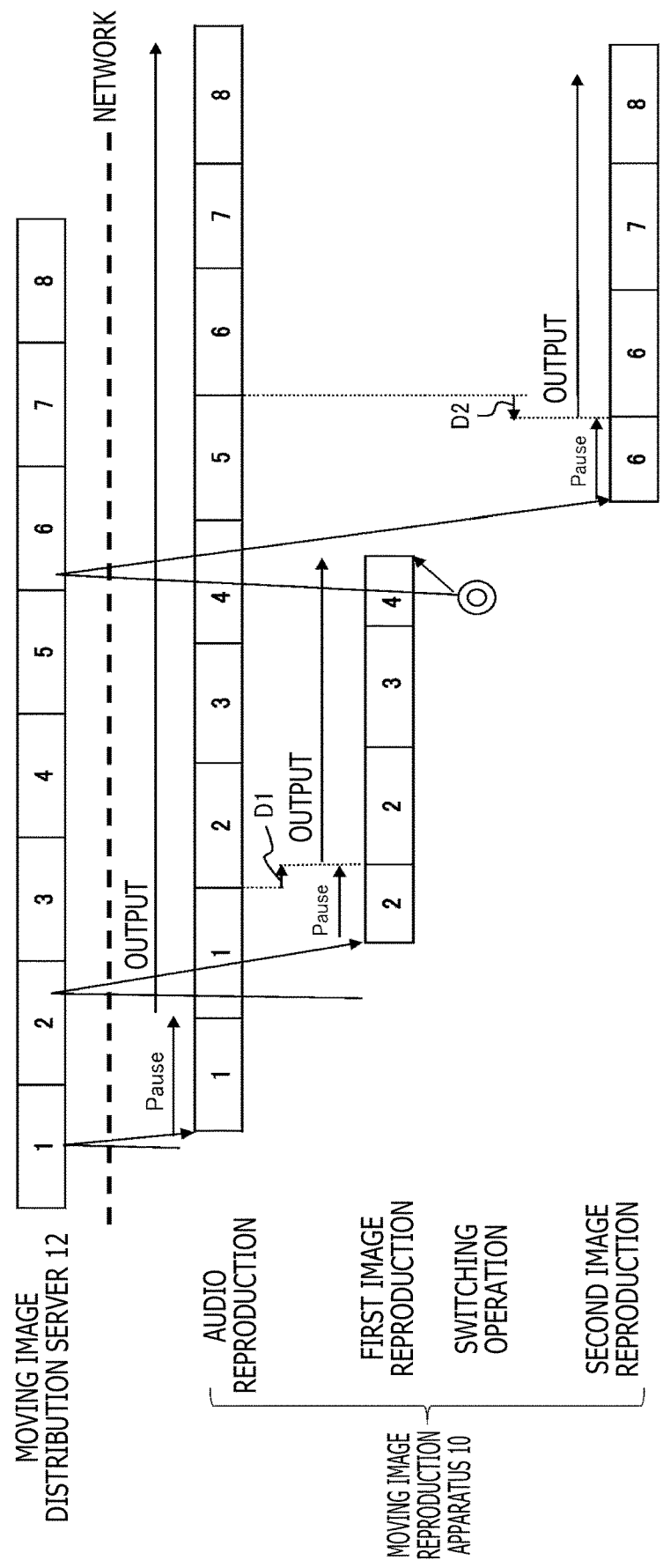
FIG. 14 is a diagram exemplifying a flow of the image and audio output when the moving image reproduction apparatus in the present embodiment adjusts the output timing such that the output timing corresponds to a time shift between moving images provided by the moving image distribution server.

FIG. 14 exemplifies a flow of the image and audio output when the moving image reproduction apparatus 10 adjusts the output timing such that the output timing corresponds to the time shift between the moving images provided by the moving image distribution server 12. Although the representation of FIG. 14 is similar to that of FIG. 7, the flow of the reproduction in the moving image distribution server 12, which is illustrated in the uppermost stage, is assumed to be that of the moving image for audio reproduction. Therefore, the moving image reproduction apparatus 10 acquires the moving image for audio reproduction and pauses the output of top data to give a predetermined period of delay, by a procedure similar to those illustrated in FIGS. 7, 10, and 12.

In FIG. 14, audio given the PTS "1" is output after the predetermined period of delay. However, in the case where the initial processing is performed as illustrated in FIG. 11, the numerical value of the PTS is not limited thereto. Then, the moving image reproduction apparatus 10 further acquires the moving image for first display. In the state in which the output of top data thereof is possible, the moving image reproduction apparatus 10 pauses the output and then outputs the top data. The time adjustment section 74 adjusts the timing thereof according to the time shift between the moving images acquired in advance. As illustrated in FIG. 13, if the moving image for first display is delayed by the period D1, the time adjustment section 74 starts outputting an image given the PTS "2" with a delay of the period D1 after the output of the audio given the same PTS "2" has started, as illustrated in the figure.

Similar time adjustment is also performed in the case where the display switching operation is performed and an image that has been switched from another image is displayed. That is, if the moving image for second display is advanced by the period D2 as illustrated in FIG. 13, the time adjustment section 74 starts outputting an image given the PTS "6" at a timing that is the period D2 earlier than the start of the output of audio given the same PTS "6," as illustrated in FIG. 14. With this adjustment, it is possible to continue to precisely output the audio and display of the different moving images without any shift. It is noted that not only does this method have effects on the shift generated when moving images are captured or generated, but also this method has similar effects on the shift generated by the decoding process of the moving images.

According to the present embodiment described above, a plurality of moving images representing one piece of content are the target of a streaming transfer, and the moving image reproduction apparatus, which is a client terminal, outputs audio of one moving image and images of another moving image in combination. Accordingly, even if the user changes a moving image to be displayed, the continuity as one piece of content can be maintained without interrupting the audio. Further, the output of the audio in the moving image reproduction apparatus is delayed by approximately one segment. With this configuration, even if it takes time to transfer or decode data of an image that has been switched from another image, the image data can be output in time for the audio that continues to be output.

Moreover, in order to suppress variations in the time shift between the reproduction in the moving image distribution server and the output in the moving image reproduction apparatus, the switching of the PTS of the acquired segment is detected at short time intervals. Then, a delay time is given to the audio output on the basis of the fastest timing at which the PTS after the switching can be acquired. With this configuration, subsequent to the segment before the switching, images of the acquired segment can be output in synchronization with the audio, regardless of the timing of the switching operation.

Further, an image that is to be switched to another image is faded out when stopped, and an image that has been switched from the image is faded in. With this configuration, it is possible to produce a smooth and natural transition despite the fact that switching is made as desired. In the present embodiment, as long as moving images representing one space are prepared, the processing on the server side that transfers the moving images by streaming can be performed without making changes to normal processing. Therefore, the difficulty of introducing the technique is low, and it is easy to apply the present embodiment to a conventional distribution system.

The present invention has been described above on the basis of the embodiment. The above-described embodiment is an exemplification, and it is to be understood by those skilled in the art that various modifications can be made to combinations of individual constituent components and individual processing processes in the embodiment and that such modifications also fall within the scope of the present invention.

INDUSTRIAL APPLICABILITY

In this way, the present invention is applicable to various information processing apparatuses such as a moving image reproduction apparatus, a mobile terminal, a personal computer, a television receiver, and a moving image distribution server, and a system including any of them, for example.

REFERENCE SIGNS LIST

8: Network
10: Moving image reproduction apparatus
12: Moving image distribution server
14: Input apparatus
16: Display
23: CPU
24: GPU
26: Main memory
32: Communication section
34: Storage section
36: Output section
38: Input section
40: Recording medium driving section
50: Request acquisition section
52: Data preparation section
54: Data storage section
56: Data transmission section
60: Input information acquisition section
62: Data acquisition section
64: Data separation section
66: Image decoding section
68: Audio decoding section
70: Output control section
72: PTS detection section
74: Time adjustment section
76: Image processing section
78: Output section

The invention claimed is:
1. A moving image reproduction apparatus comprising:
circuitry configured to
acquire data of a plurality of moving images transferred from a server by streaming, the plurality of moving images representing a same space, the plurality of moving images representing the same space having common audio data;

time-divide the plurality of moving images into units of segment data;
generate a presentation time stamp that defines an output timing of image data and audio data for each segment data;
acquire audio data from one of the plurality of moving images and acquire first image data from a first moving image of the plurality of moving images;
pause output of audio data of a first segment data by a predetermined period and output the audio data of the first segment data after the predetermined period;
pause output of first image data of the first segment data and first image data of a second segment data after the first segment data until a presentation time stamp of audio data is for the second segment data;
output audio data and first image data having a same presentation time stamp;
accept, from a user, a switching operation for switching a first image included in the first moving image that is an output target, to a second image included in a second moving image;
in response to the switching operation, stop output of the first moving image, acquire data of the second moving image having a presentation time stamp, and continue to output audio data; and
output second image data from the second moving image at a timing when a presentation time stamp of the audio data changes to match the presentation time stamp of the second image data.

2. The moving image reproduction apparatus according to claim 1,
wherein the moving image reproduction apparatus has a plurality of functions each configured to request data of a moving image from the server and the circuitry is configured to detect a presentation time stamp given to the acquired segment data, so that a resolution for detecting a timing at which the presentation time stamp is changed is subdivided.

3. The moving image reproduction apparatus according to claim 1, wherein the
predetermined period of delay is obtained by adding a reproduction duration of one segment to a time taken from a request to the server for the data of the second moving image until the second image of the data becomes possible.

4. The moving image reproduction apparatus according to claim 1, wherein the
predetermined period of delay is a reproduction duration of one segment.

5. The moving image reproduction apparatus according to claim 1, wherein the circuitry is configured to
request, according to the switching operation, the server to change a moving image from which image data is acquired and that is among moving images transferred by streaming.

6. The moving image reproduction apparatus according to claim 1, wherein the circuitry is configured to
also acquire, from the server, data of a moving image that is not the output target, and
stop outputting image data acquired from the moving image that is not the output target, in a state in which the output of the image data is possible in units of segments obtained by time-dividing a stream, and when the switching operation is performed, output, among pieces of the stopped image data, image data of the moving image to which the output target has been switched.

7. The moving image reproduction apparatus according to claim 1,
wherein, according to the switching operation, the circuitry is configured to fade out the first image that is to be switched to the second image, and fade in the second image that has been switched from the first image.

8. The moving image reproduction apparatus according to claim 1, wherein the circuitry is configured to
acquire, from the server, information related to a shift between time axes of the plurality of moving images, and
adjust an output start timing of the image data with respect to the audio data from the one of the plurality of moving images on a basis of the information related to the shift.

9. A moving image reproduction system comprising:
a server configured to transfer, by streaming, data of a plurality of moving images representing a same space; and
a moving image reproduction apparatus configured to output a moving image to a display by using the data of the plurality of moving images,
wherein the moving image reproduction apparatus includes
circuitry configured to
acquire data of a plurality of moving images transferred from a server by streaming, the plurality of moving images representing a same space, the plurality of moving images representing the same space having common audio data;
time-divide the plurality of moving images into units of segment data;
generate a presentation time stamp that defines an output timing of image data and audio data for each segment data;
acquire audio data from one of the plurality of moving images and acquire first image data from a first moving image of the plurality of moving images;
pause output of audio data of a first segment data by a predetermined period and output the audio data of the first segment data after the predetermined period;
pause output of first image data of the first segment data and first image data of a second segment data after the first segment data until a presentation time stamp of audio data is for the second segment data;
output audio data and first image data having a same presentation time stamp;
accept, from a user, a switching operation for switching a first image included in a first moving image that is an output target, to a second image included in a second moving image;
in response to the switching operation, stop output of the first moving image, acquire data of the second moving image having a presentation time stamp, and continue to output audio data; and
output second image data from the second moving image at a timing when a presentation time stamp of the audio data changes to match the presentation time stamp of the second image data.

10. A moving image reproduction method performed by a moving image reproduction apparatus, comprising:
acquiring data of a plurality of moving images transferred from a server by streaming, the plurality of moving images representing a same space, the plurality of moving images representing the same space having common audio data;

time-dividing the plurality of moving images into units of segment data;

generating a presentation time stamp that defines an output timing of image data and audio data for each segment data;

acquiring audio data from one of the plurality of moving images and acquiring first image data from a first image of the plurality of moving images;

pausing output of audio data of a first segment data by a predetermined period and outputting the audio data of the first segment data after the predetermined period;

pausing output of first image data of the first segment data and first image data of a second segment data after the first segment data until a presentation time stamp of audio data is for the second segment data;

outputting audio data and first image data having a same presentation time stamp;

accepting, from a user, a switching operation for switching a first image included in a first moving image that is an output target, to a second image included in a second moving image;

in response to the switching operation, stopping output of the first moving image, acquiring data of the second moving image having a presentation time stamp, and continue to output audio data; and outputting second image data from the second moving image in synchronization with each other at a timing when a presentation time stamp of the audio data changes to match the presentation time stamp of the second image data.

11. The moving image reproduction method according to claim 10, wherein the moving image reproduction apparatus has a plurality of functions each configured to request data of a moving image from the server, the method further comprising detecting a presentation time stamp given to the acquired segment data, so that a resolution for detecting a timing at which the presentation time stamp is changed is subdivided.

12. The moving image reproduction method according to claim 10, wherein the predetermined period of delay is obtained by adding a reproduction duration of one segment to a time taken from a request to the server for the data of the second moving image until the second image of the data becomes possible.

13. The moving image reproduction method according to claim 10, wherein the predetermined period of delay a reproduction duration of one segment.

14. The moving image reproduction method according to claim 10, further comprising requesting, according to the switching operation, the server to change a moving image from which image data is acquired and that is among moving images transferred by streaming.

15. The moving image reproduction method according to claim 10, further comprising:

also acquiring, from the server, data of a moving image that is not the output target, and stopping output of image data acquired from the moving image that is not the output target, in a state in which the output of the image data is possible, and when the switching operation is performed, outputting, among pieces of the stopped image data, image data of the moving image to which the output target has been switched.

16. The moving image reproduction method according to claim 10, further comprising fading out the first image that is to be switched to the second image, and fading in the second image that has been switched from the first image.

17. The moving image reproduction method according to claim 10, further comprising:

acquiring, from the server, information related to a shift between time axes of the plurality of moving images, and adjusting an output start timing of the image data with respect to the audio data from the one of the plurality of moving images on a basis of the information related to the shift.

18. A non-transitory computer readable storage device having computer readable instructions that when executed by circuitry cause the circuitry to:

acquire data of a plurality of moving images transferred from a server by streaming, the plurality of moving images representing a same space, the plurality of moving images representing the same space having common audio data;

time-divide the plurality of moving images into units of segment data;

generate a presentation time stamp that defines an output timing of image data and audio data for each segment data;

acquire audio data from one of the plurality of moving images and acquire first image data from first moving image of the plurality of moving images;

pause output of audio data of a first segment data by a predetermined period and output the audio data of the first segment data after the predetermined period;

pause output of first image data of the first segment data and first image data of a second segment data after the first segment data until a presentation time stamp of audio data is for the second segment data;

output audio data and first image data having a same presentation time stamp;

accept, from a user, a switching operation for switching a first image included in a first moving image that is an output target, to a second image included in a second moving image;

in response to the switching operation, stop output of the first moving image, acquire data of the second moving image having a presentation time stamp, and continue to output audio data; and output second image data from the second moving image at a timing when a presentation time stamp of the audio data changes to match the presentation time stamp of the second image data.

19. The non-transitory computer readable storage device according to claim 18, wherein the circuitry is further caused to:

also acquire, from the server, data of a moving image that is not the output target, and stop output of image data acquired from the moving image that is not the output target, in a state in which the output of the image data is possible in units of segments obtained by time-dividing a stream, and when the switching operation is performed, output, among pieces of the stopped image data, image data of the moving image to which the output target has been switched.

20. The non-transitory computer readable storage device according to claim 18, wherein the circuitry is further caused to:

acquire, from the server, information related to a shift between time axes of the plurality of moving images, and adjust an output start timing of the image data with respect to the audio data from the one of the plurality of moving images on a basis of the information related to the shift.

* * * * *